(12) United States Patent
Loustanau et al.

(10) Patent No.: US 7,241,054 B2
(45) Date of Patent: Jul. 10, 2007

(54) CONNECTION DEVICE FOR CONNECTING A ROLLING CONTACT BEARING TO A WHEEL HUB UNIT

(75) Inventors: Jean-Gérard Loustanau, Fondettes (FR); Angelo Vignotto, Turin (IT); Marcus Caldana, Lidköping (SE)

(73) Assignee: Aktiebolaget SKF, Gothenburg (SE)

( * ) Notice: Subject to any disclaimer, the term of this patent is extended or adjusted under 35 U.S.C. 154(b) by 59 days.

(21) Appl. No.: 11/126,967

(22) Filed: May 11, 2005

(65) Prior Publication Data
US 2006/0023983 A1    Feb. 2, 2006

(51) Int. Cl.
*F16C 19/08* (2006.01)
(52) U.S. Cl. .................................... 384/544; 384/589
(58) Field of Classification Search ................ 384/544, 384/537, 589, 584, 585, 906, 447; 29/898.07, 29/898.061
See application file for complete search history.

(56) References Cited

U.S. PATENT DOCUMENTS

| 3,405,982 | A | * | 10/1968 | Krenn | 384/537 |
| 5,090,834 | A | * | 2/1992 | Yamamoto | 403/277 |
| 5,178,472 | A | * | 1/1993 | Lawson | 384/537 |
| 6,450,585 | B1 | * | 9/2002 | Kochsiek | 301/124.1 |
| 6,497,515 | B1 | * | 12/2002 | Sahashi et al. | 384/544 |
| 6,692,157 | B2 | * | 2/2004 | Sahashi et al. | 384/537 |
| 6,832,854 | B2 | * | 12/2004 | Umekawa et al. | 384/544 |
| 2004/0234182 | A1 | * | 11/2004 | Tajima et al. | 384/544 |

FOREIGN PATENT DOCUMENTS

DE    101 33 094    1/2003

* cited by examiner

*Primary Examiner*—Thomas R. Hannon
(74) *Attorney, Agent, or Firm*—Merchant & Gould P.C.

(57) ABSTRACT

Connection device for a rolling contact bearing which is to be connected to a wheel hub, the connection device being suitable for connecting an inner race of the bearing to a cylindrical body of the wheel hub, and presenting a peripheral connecting outline which is obtained around the cylindrical body of the wheel hub, and a complementary connecting outline which is obtained inside the inner race, and is of a shape which complements the peripheral outline in order to render angularly integral in relation to each other the inner race and the cylindrical body; the two outlines both presenting a radius (R) of variable angular dimensions with continuity on a plane which is transverse to a rotation axis (A) of the bearing, and being both provided, in relation to the rotation axis (A), with at least one convex portion.

9 Claims, 2 Drawing Sheets

CONNECTION DEVICE FOR CONNECTING A ROLLING CONTACT BEARING TO A WHEEL HUB UNIT

The present invention relates to a connection device for connecting a rolling contact bearing to a wheel hub unit.

In general, rolling contact bearings comprise an inner race, and are mounted on wheel hubs by shrink fitting the inner race onto a spindle of the wheel hub, and by cold plastic deformation of a small annular border of the spindle abutting the inner race itself in order to block the inner race.

Practical experience has been able to demonstrate that even if the forces exerted by the deformed small annular border on the inner race are more than sufficient to block the inner race itself in an axial direction, they are not however necessary to prevent eventual and accidental reciprocal rotation between the inner race and the spindle, which can cause noise and vibration as well as reduce the useful working life of the bearing.

The aim of the present invention is to produce a connection device for connecting a rolling contact bearing to a wheel hub, which will permit, in simple and cost-effective fashion, to render angularly integral in relation to each other an inner race of a bearing and a spindle of a wheel hub.

According to the present invention a connection device will be produced for connecting a rolling contact bearing to a wheel hub, the connection device being suitable for connecting an inner race of the bearing to a cylindrical body of the wheel hub, and being characterised by the fact of comprising a connecting peripheral outline which is obtained around the cylindrical body of the wheel hub, and a complementary connecting peripheral outline which is obtained inside the inner race, and which presents a shape which is complementary to the connecting peripheral outline in order to render angularly integral in relation to each other the inner race and the cylindrical body; the connecting peripheral outline and the complementary peripheral connecting outline both presenting a radius which is of variable angular dimensions with continuity on a plane which is transverse to a rotation axis of the bearing, and which both comprise, in relation to the axis, at least one respective convex portion.

The present invention will now be described with reference to the attached drawings, which illustrate a non-limiting form of embodiment of the present invention, in which.

Figure 1:
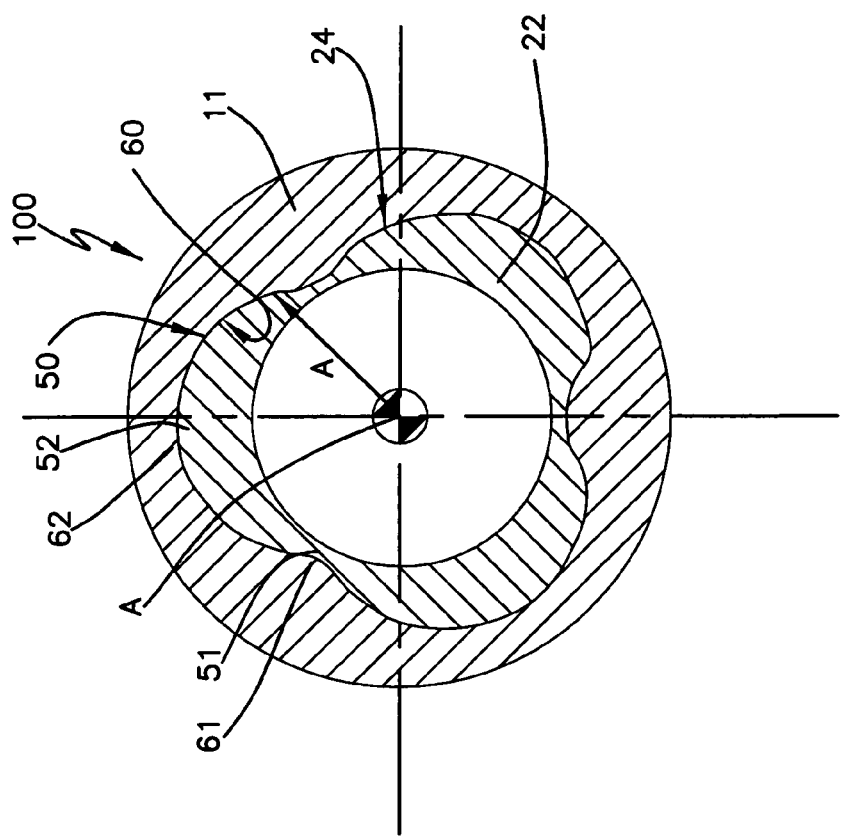
FIG. 1 is a section view of a first preferred form of embodiment of a connection device for connecting a rolling contact bearing to a wheel hub according to the present invention.

With reference to FIG. 1, the number 100 refers to a connection device in its entirety for connecting a rolling contact bearing 10 to a wheel hub 20.

The bearing 10 presents a rotation axis A, and comprises an inner race 11 which is co-axial to the axis A, an outer race 12 which is co-axial to the inner race 11, and two crowns 14 of rolling bodies 15, which are interposed between the two races 11 and 12, and which are each mounted inside a respective rolling track 16.

In the form of embodiment which is shown in FIG. 1, the rolling bodies 15 are defined by spheres, and the inner race 11 comprises two annular portions 11', which are mounted next to each other on the wheel hub 20 in relation to the axis A, and which each present a relative track 16.

The wheel hub 20 comprises a flange 21 which is transverse to the axis A, and a spindle 22, which is integral with the flange 21, and which extends along the axis A inside the inner race 11 and ends with a small border 23 which is suitable for being rolled in such a way as to abut the inner race 11 itself in order to close the two portions 11' against the flange 21.

The spindle 22 is radially delimited towards the outside by a mounting surface 24 for the inner race 11, and presents, in addition, a step 25, which is interposed between the surface 24 and the flange 21, and which defines an axial countercheck for the inner race 11.

Figure 2:
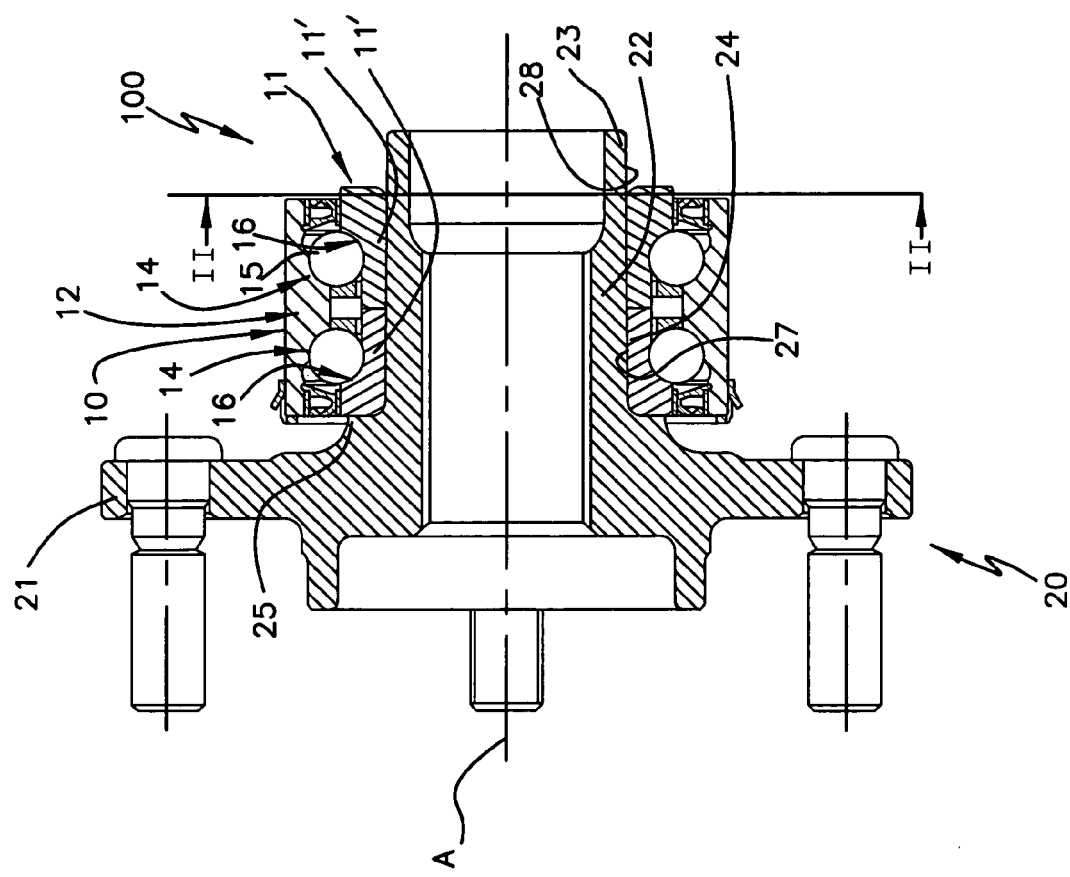
FIG. 2 is a section, on an enlarged scale, according to the line II—II which is shown in FIG. 1.

As is better illustrated in FIG. 2, the device 100 comprises a peripheral connecting outline 50 which is obtained around the spindle 22, and a complementary connecting outline 60, which is in its turn obtained inside the inner race 11, and which presents a shape which is complementary to the outline 50 in order to render angularly integral with each other the spindle 22 and the inner race 11 itself.

The outline 50 extends substantially along the whole of the surface 24 as far as the step 25, and presents, like the outline 60, a radius (R) of angularly variable dimensions with continuity on a plane which is transverse to the axis A.

According to a preferred form of embodiment of the device 100 which is easily understandable from the above description, at least for the section which interests the annular portion 11' which is mounted last on the spindle 22, the outline 5 is conformed, like the outline 6 and in relation to the axis A, according to a tapering shape of surfaces 27 and 28, which decrease opposite the step 25.

The outlines 50 and 60 comprise a number N1 of convex portions 51 and 61 in relation to the axis A itself, and a number N2 of concave portions 52 and 62 in relation to the axis A. The values of the numbers N1 and N2 depend on the necessary construction and planning characteristics, and may be equal to each other, as in cases of this kind, or different from each other.

In particular, in FIG. 2, a case is illustrated in which both the number N1 and the number N2 have a value which is equal to three and the portions 51, 61 and 52, 62 are alternated with each other around the axis A.

The presence of the outlines 50 and 60 permits to render angularly integral in relation to each other the inner race 11 and the spindle 22 in such a way as to prevent any accidental rotation whatsoever between the inner race 11 and the spindle 22 themselves.

FIGS. 3, 4, 5, and 6 illustrate respective alternative examples of application of the device 100 and the same number of bearings 10, which will gradually be described below in detail.

Figure 3:
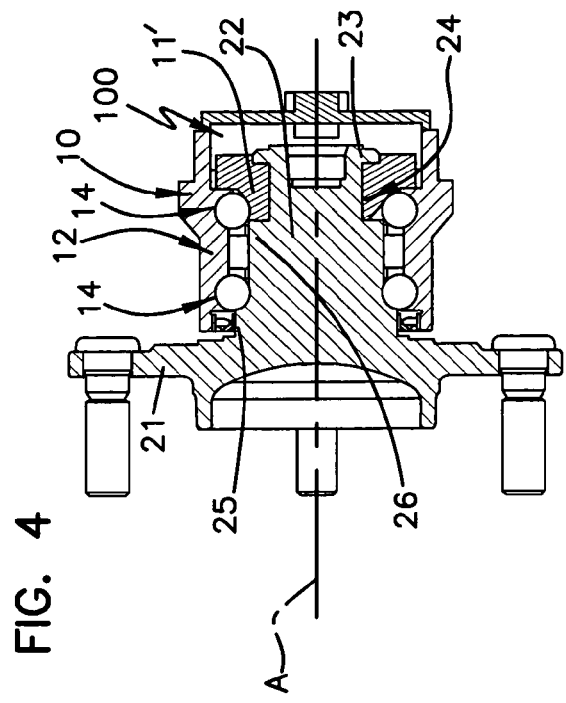
FIGS. 3 to 6 illustrate, in section, respective alternative preferred forms of application of the connection device which is shown in FIG. 1.

FIG. 3 illustrates a bearing 10 in which the rolling bodies 15 are defined by conical rollers which are mounted according to a so-called "O" conformation, and in which is inserted in the outer race 12, in an axially intermediate position between the two crowns 14, a speed sensor 30 for reading the angular speed of the bearing 10 itself. In addition, FIG. 3 also illustrates the small rolled border 23 abutting the inner race 11.

Figure 4:
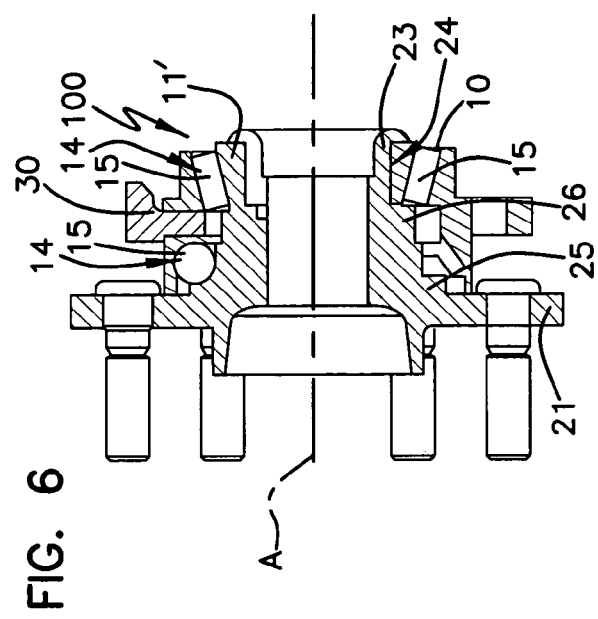

FIG. 4 illustrates a bearing 1oin which the annular portion 11' of the inner race 11 is arranged in such a way as to abut the step 25 and is integrated in the step 25 itself, on which is also obtained the relative rolling track 16. As a consequence, the device 100 extends along the surface 24 only for the section of the surface 24 which is interested by the remaining portion 11', which results as axially blocked by the small rolled border 23 and by a shoulder 26 of the spindle 22.

Figure 5:
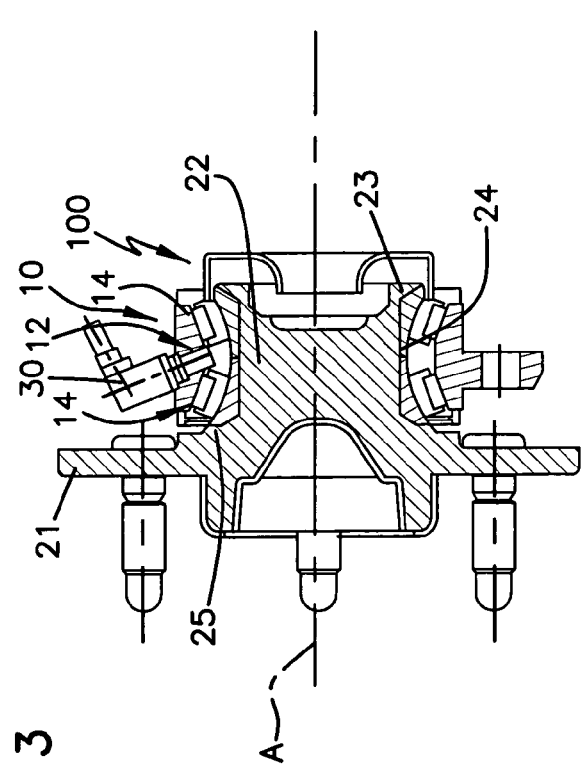

FIG. 5 illustrates a bearing 10, in which the portion 11' of the inner race 11 is arranged in such a way as to abut the step 25 and is integrated into the spindle 22, and the relative rolling tack 16 is obtained on the surface 24 of the spindle 22 itself. As a consequence, the device 100 extends along the surface 24 only for the section of the surface 24 which is interested by the remaining portion 11', which results as axially blocked by the small rolled border 23 and by a shoulder 26 of the spindle 22.

In addition, the bearing 10 which is illustrated in FIG. 5 comprises a speed sensor 30 which is inserted in an axial direction between the two races 11 and 12 in order to read the angular speed of the bearing 10 itself.

Figure 6:
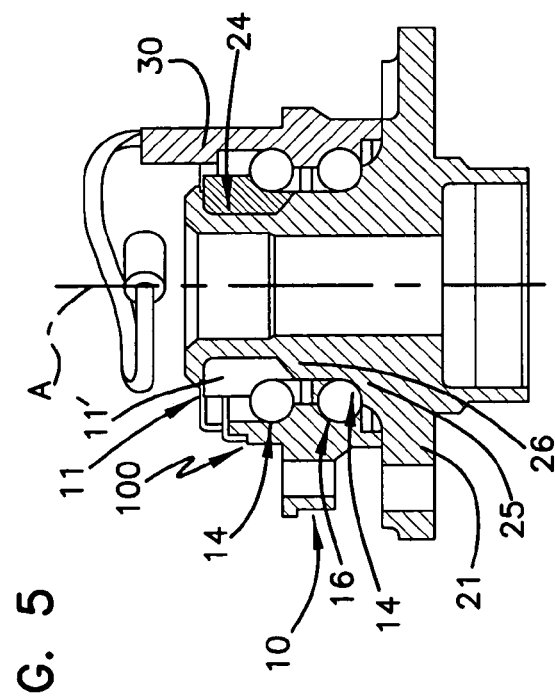

Finally, FIG. 6 illustrates a bearing 10, in which the portion 11' of the inner race 11 is arranged in such a way as to abut the step 25 and is integrated into the spindle 22, and the relative rolling track 16 is obtained on the surface 24 of the spindle 22 itself, and in which the crown 14 relating to the track 16 integrated into the spindle 22 is defined by a number of spheres 15, while the crown 14 relating to the portion 11' is defined by a number of conical rollers 15.

Also in this case, the device 100 extends along the surface 24 only for the section of the surface 24 which is interested by the remaining portion 11', which results as axially blocked by the small rolled border 23 and by a shoulder 26 of the spindle 22.

Finally, the bearing 10 which is illustrated in FIG. 6 comprises a speed sensor 30, which is suitable for reading the angular speed of the bearing 10 itself, and which is inserted through the outer race 12 in a position which is axially intermediate between the two crowns 14.

It is intended that the present invention should not be limited to the form of embodiment which is herein described and illustrated, which is to be considered as an example of a form of embodiment of a connection device for connecting a rolling contact bearing to a wheel hub, and which may instead be subject to further modifications in terms of the shape and disposition of its parts, as well as to details pertaining to construction and assembly.

The invention claimed is:

1. Connection device for connecting a rolling contact bearing to a wheel hub, the connection device being suitable for connecting an inner race of the bearing to a cylindrical body of the wheel hub, comprising a connecting peripheral outline which is obtained around a cylindrical body of the wheel hub, and a complementary connecting peripheral outline which is obtained inside the inner race, and which presents a shape which is complementary to the connecting peripheral outline to render angularly integral in relation to each other the inner race and the cylindrical body; the connecting peripheral outline and the complementary peripheral connecting outline both presenting a radius which is of variable angular dimensions with continuity on a plane which is transverse to a rotation axis of the bearing, and which both comprise, in relation to the axis at least one respective convex portion; wherein the peripheral connecting outline and the complementary connecting outline are conformed according to a tapering shape in relation to the rotation axis.

2. Connection device according to claim 1, wherein the peripheral connecting outline and the complementary connecting outline both comprise, in relation to the rotation axis, a first determined number of convex portions and a second determined number of concave portions.

3. Connection device according to claim 2, wherein the first determined number of the convex portions and the second determined number of the concave portions coincide in relation to each other; the convex portions being alternated around the rotation axis A in relation to the concave portions.

4. Connection device according to claim 1, wherein said rolling contact bearing comprises two crowns of rolling bodies which are mounted inside respective rolling tracks.

5. Connection device according to claim 4, wherein said rolling bodies are defined by spheres.

6. Connection device according to claim 5, wherein at least a first rolling track of the said two rolling tracks is produced on the said inner race.

7. Connection device according to claim 6, wherein a second rolling track of the said two rolling tracks is produced directly on the said cylindrical body.

8. Connection device according to claim 6, wherein the inner race is defined by two annular portions which are independent of each other and which are mounted axially next to each other on the said cylindrical body; each annular body presenting a respective rolling track.

9. Connection device according to claim 4, wherein said rolling bodies are defined by conical rollers.

* * * * *